Figure 1:
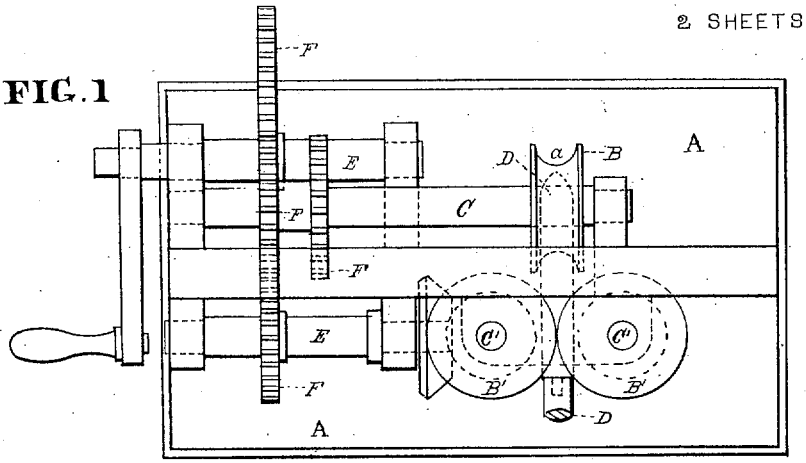

2 Sheets--Sheet 1.

S. P. M. TASKER.

Manufacture of Welded Tubing.

No. 5,190. Reissued Dec. 17, 1872.

2 SHEETS. SHEET 1.

WITNESSES

Thomas J. Bewley.

Stephen Ustick

INVENTOR

Stephen P. M. Tasker.

S. P. M. TASKER.
Manufacture of Welded Tubing.
No. 5,190. Reissued Dec. 17, 1872.
2 SHEETS. SHEET 2.
FIG. 4
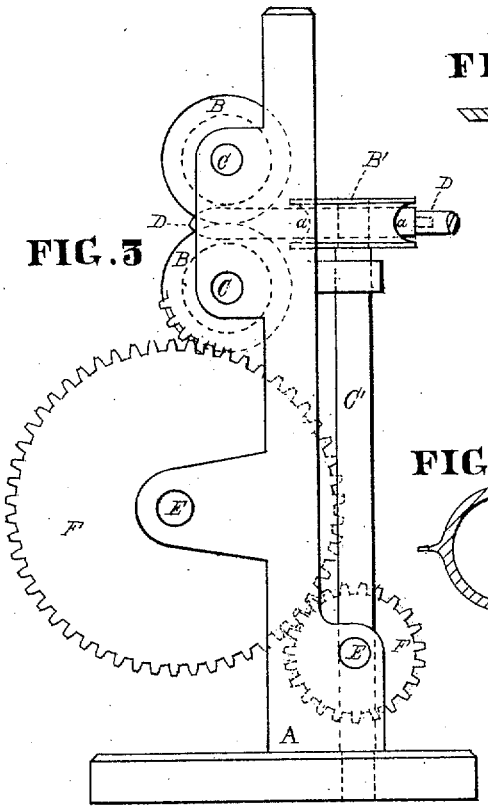
FIG. 3
FIG. 5
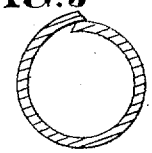
FIG. 6
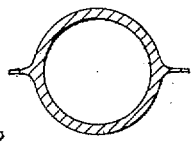
FIG. 7
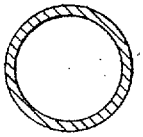
WITNESSES.
Thomas J. Bewley.
Stephen Ustick
INVENTOR.
Stephen P. M. Tasker.

UNITED STATES PATENT OFFICE.

STEPHEN P. M. TASKER, OF PHILADELPHIA, PENNSYLVANIA.

IMPROVEMENT IN THE MANUFACTURE OF WELDED TUBING.

Specification forming part of Letters Patent No. 91,791, dated June 22, 1869; reissue No. 5,190, dated December 17, 1872.

*To all whom it may concern:*

Be it known that I, STEPHEN P. M. TASKER, of the city of Philadelphia, and State of Pennsylvania, have invented certain Improvements in Welding and Sizing Wrought-Metal Tubing, of which the following is a specification:

The usual method of welding and sizing metal tubes is as follows: The tubes having been previously bent with their beveled edges overlapping each other for making what is called lap-welded joints, or with their square edges butting against each other for making butt-welded joints, after being laid aside to cool and cast off their scales, are returned to the furnace and brought to a welding heat, and are then passed through a pair of grooved rolls to weld the joints and reduce the tubes to their requisite size. The outer corners of the grooves at the peripheries of the rolls have necessarily to be rounded off to prevent their cutting into the outer surfaces of the tubes or leaving marks thereon. Consequently the metal in the rolling process is pressed around these corners, producing thick places at two opposite points and from end to end of the tubes, which sometimes project between the edges of the rolls, forming fins. To overcome these defects, after the tubes have been allowed to cool and cast off their scales, they are again reheated and passed through the rolls, to roll down the fins and thick places, and bring the tubes to a uniform thickness. To accomplish this the tubes are placed as they are entered between the rolls in a position at right angles to the one they assumed at the previous rolling, so as to bring their fins and thick places at the bottom or middle and concentric parts of the grooves of the rolls. This requires great care to prevent any imperfection in the tubes, which would require them to be again reheated and passed through the rolls. To avoid more than one heating and rolling of the tubes in the welding and sizing process is the object of my invention.

My invention relates to first bending the skelp into tubular form, by any suitable mechanism, and then welding and sizing it at a single operation, by passing it at a welding heat through two pairs of rolls, the second pair in advance of the first pair, and running in a plane at right angles thereto, or nearly so, so as to roll down the fins and thickened parts which are formed at opposite sides of the tubes by the action of the first pair of rolls, and thus to make a complete welding and sizing of the tubes at one operation, whereby I dispense with the reheating and rerolling of the tubes, which are necessary in the usual mode, as above stated.

It will thus be seen that a large amount of time is saved by my improved method; and a better quality of tubes is secured by not subjecting them to so many heats, as every time they are reheated more or less scales are formed, reducing the thickness and injuring the quality of the metal.

Figure 2:
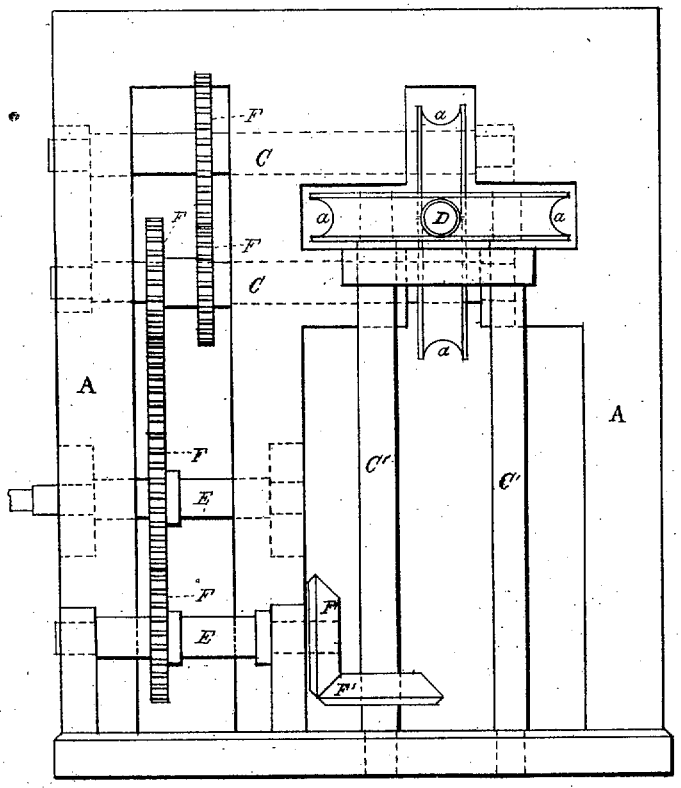

Figure 1 is a plan view of my improved machine. Fig. 2 is a rear elevation of the same. Fig. 3, Sheet No. 2, is a side elevation. Fig. 4 represents a section of a skelp for a lap-welded tube on an enlarged scale. Fig. 5 is a section of the same when bent into the proper form for the welding operation. Fig. 6 represents a section of a tube in the form it assumes in passing through the first pair of rolls B B. Fig. 7 represents a section of a tube in the finished form given it by the second pair of rolls B′ B′.

Like letters in all the figures indicate the same parts.

A represents the permanent frame with which the several parts of the improved machine are connected. B B, on the horizontal shafts C C at the front of the machine, are grooved rolls, through which the bent tubes are passed for welding; and B′ B′, in advance of the same, are like rolls on the vertical shafts C′ C′. Concentric with the grooves *a* in the peripheries of the rolls is the ordinary mandrel D, which is held in position in the usual manner. The shafts C C and C′ C′ of the rolls B B B′ B′ and the intermediate shafts E E are connected together by spur-gear wheels F and miter-wheels F′. Either of the shafts in the series may be connected with the motive power.

I do not confine myself to the use of the gearing represented in the drawing, but purpose using any suitable means for communicating motion to the rolls, and therefore deem a further description thereof unnecessary.

The operation is as follows: The bent tubes as they pass through the rolls B B are welded and brought to their proper size and form except at two opposite points, which pass the rounded corners of the grooves *a*. The metal at these points being pressed out is thickened, and sometimes fins are produced, as seen in the cross-section, Fig. 6. As the tubes pass through the second pair of rolls B′ B′, the bottom or middle parts of the grooves being at right angles to that of the first pair of rolls, and these parts, being brought into contact with the fins or enlarged parts of the skelp, press them down and bring the tubes to a perfect concentric form, with a uniform thickness of metal throughout their whole circumference. Thus the tubes are welded and brought into proper size and form at one operation, whereby the cost of manufacturing them is greatly reduced and their quality improved by dispensing with the extra reheating and rerolling incidental to the ordinary mode of welding and sizing.

It will be seen that instead of placing the second pair of rolls at right angles with that of the first pair, all that is requisite is to have them so arranged as to run in different planes from the first, so that the concentric parts of the grooves shall bite on the thick places and fins of the tubes that are produced by the action of the first pair. But, nevertheless, I prefer placing them at right angles, as represented in the drawing.

I claim as my invention—

The method herein described of manufacturing welded tubing—that is to say, first bending the skelp to the form of a tube by any suitable machinery, then welding the joint and rolling down inequalities while at a welding heat by means of two pairs of rolls, constructed, arranged, and operating as set forth.

STEPHEN P. M. TASKER.

Witnesses:

THOMAS J. BEWLEY,

STEPHEN USTICK.